United States Patent [19]

Bergloff et al.

[11] Patent Number: 5,080,700
[45] Date of Patent: Jan. 14, 1992

[54] ROTATABLE ADSORBER APPARATUS FOR CONTINUOUSLY PURIFYING GASES

[75] Inventors: Dag Bergloff; Alfred Weinmann; Georg Ickinger; Walter Schinninger; Leopold Sidla, all of Graz; Karl Jirenec, Maria Enzersdorf; Ernst Markytan, Vienna, all of Austria

[73] Assignee: Maschinenfabrik Andritz Actiengesellschaft, Graz, Austria

[21] Appl. No.: 586,386

[22] Filed: Sep. 19, 1990

Related U.S. Application Data

[63] Continuation of Ser. No. 375,692, Jul. 5, 1989, abandoned.

[30] Foreign Application Priority Data

Jul. 8, 1988 [AT] Austria ............................... 1775/88

[51] Int. Cl.$^5$ .............................................. B01D 53/06
[52] U.S. Cl. ........................................ 55/181; 55/390
[58] Field of Search .................. 55/34, 60, 61, 78, 181, 55/390, 179, 180

[56] References Cited

U.S. PATENT DOCUMENTS

| | | | |
|---|---|---|---|
| 1,590,266 | 6/1926 | Tiedtke et al. | 55/390 X |
| 2,294,214 | 8/1942 | Seinfeld | 55/390 X |
| 2,639,000 | 5/1953 | Edwards | 55/390 X |
| 2,739,670 | 3/1956 | Miller | 55/34 X |
| 2,823,764 | 2/1958 | Miller | 55/34 X |
| 3,197,944 | 8/1965 | Westeren et al. | 55/390 X |
| 3,201,921 | 8/1965 | Heyes | 55/78 X |
| 3,246,961 | 4/1966 | Karlsson | 55/78 X |
| 3,487,608 | 1/1970 | Gräff | 55/179 X |
| 3,507,621 | 4/1970 | Goodman et al. | 55/389 X |
| 3,757,492 | 9/1973 | Graff | 55/181 |
| 4,046,525 | 9/1977 | Matsuo et al. | 55/179 X |
| 4,263,028 | 4/1981 | Ohlmeyer et al. | 55/390 |
| 4,581,047 | 4/1986 | Larsson | 55/179 |
| 4,653,199 | 3/1987 | McLeod et al. | 55/34 X |
| 4,778,492 | 10/1988 | Dawson | 55/78 |
| 4,808,317 | 2/1989 | Berry et al. | 55/78 X |

FOREIGN PATENT DOCUMENTS

| | | |
|---|---|---|
| 1544036 | 7/1969 | Fed. Rep. of Germany . |
| 2534068 | 9/1976 | Fed. Rep. of Germany . |
| 2856184 | 7/1980 | Fed. Rep. of Germany ........ 55/390 |
| 608436 | 7/1926 | France ................................ 55/179 |

Primary Examiner—Robert Spitzer
Attorney, Agent, or Firm—Paul & Paul

[57] ABSTRACT

A process and apparatus for continuously purifying gases by removing entrained burdening substances therefrom, wherein the gas is loaded with entrained substances is passed substantially radially through adsorbing material arranged about an axis of rotation as an adsorber bed, the substances being retained on the adsorbing materials in the course of their rotational movement about the axis of rotation, and in the course of further rotational movement the load of retained substances is desorbed, optionally after inertization, by flushing with a fluid medium, e.g., hot gases or steam, and the adsorbing material may then be cooled and/or dried. Rotational movement is preferably done intermittently, and the feed stream to and the drain stream from the adsorbing material each are conducted through a confined space extending at least in one direction substantially parallelly to the axis of rotation or to the adsorber bed, the confined space being fed and drained axially. The direction of the feed stream is at least essentially opposite to that of the drain stream in relation to the adsorber bed.

1 Claim, 2 Drawing Sheets

ROTATABLE ADSORBER APPARATUS FOR CONTINUOUSLY PURIFYING GASES

This application is a continuation of application Ser. No. 375,692, filed July 5, 1989, now abandoned.

The present invention relates to a process of continuously purifying gases by removing entrained burdening substances therefrom, wherein the gas loaded with said substances is passed through adsorbing materials arranged about an axis of rotation and being passed at least substantially radially, said burdening substances being retained on the adsorbing materials in the course of their rotational movement about said axis of rotation as an adsorber bed, and wherein in the course of said rotational movement the load of retained substances is desorbed—possibly after inertization—by flushing with a flowing medium, in particular with hot gases or steam, and the adsorbing material, after said desorption, is cooled and/or dried, if necessary, and wherein further said rotational movement is preferably done intermittently, and wherein the feed stream to and the drain stream from the adsorbing material each are conducted in a confined space extending at least in one direction substantially parallelly to said axis of rotation and/or to said adsorber bed, said confined space being fed and/or drained axially; and furthermore to an apparatus for running said process.

Processes and apparatus of this type are known, for instance, from DE-AS 1544036 and DE-PS 2 534 068, the latter printed publication describing arrangements with horizontal as well as with vertical axes of rotation.

These known arrangements either require a closed housing or are otherwise structurally complicated because they call for separate deflection conduits outside of the adsorber boxes.

According to the invention, these disadvantages are avoided mainly by providing for the direction of flow immediately at the adsorber bed to be reversed; in other words, the feed stream to the adsorber bed is oriented in one direction and the drain stream from the adsorber bed is oriented in the opposite direction.

The process according to the invention is thus characterized in that the directions of feed stream and drain stream in respect of the adsorber bed are essentially oppositely oriented.

The feed stream of the adsorber bed preferably passes an inlet flow space tapering in a feeding direction.

For the uniform utilization of the adsorber bed over its entire length, the gas is conveniently gassed in the inlet flow space over flow and/or pressure control means, in particular distributing means such as distributing screens, perforated plates and/or baffle plates.

Particularly in inlet flow spaces of even cross section over their entire length and with steam desorption, desorption fluid is conveniently introduced essentially radially into the inlet flow space via a chain of nozzles extending along the inlet flow space, the outlet openings of the nozzle chain being at least essentially rectangular.

The adsorber unit according to the invention for carrying out the process according to the invention, wherein adsorber material is disposed cylindrically about an axis of rotation, in particular in axially extending cells for axial feeding stream and draining stream and radial permeating stream, which cells are circulated, in particular intermittently, during operation, is mainly characterized in that inlet flow spaces and outlet flow spaces with reversed flowing direction are provided on the adsorber material on the adsorber bed surface between feed stream direction and drain stream direction.

Inlet and outlet conduits for loading and desorption, as well as preferably also for inertization, cooling and/or drying of the adsorber material, are disposed on one front face of the cylinder only.

Outlet flow spaces tapering away from the inlet flow side are conveniently provided, the inlet flow spaces particularly tapering in their longitudinal extension in axial direction from the inlet flow side away to about one fifth to one tenth of their cross sections, in particular to 15 to 18 percent thereof.

Pressure and/or flow distributors, in particular screens, perforated plates and/or baffle plates are conveniently provided in the inlet flow spaces.

Each one of the inlet flow spaces may further be provided with a chain of nozzles extending along the inlet flow space for introducing desorption fluid, in particular steam, particularly if the inlet flow spaces are of unchanging cross sections over their entire lengths, with the nozzle chains having at least essentially rectangular outlet openings conveniently being provided.

The inlet flow spaces and outlet flow spaces are conveniently formed at least essentially identically and extend symmetrically to the adsorber bed.

According to a preferred embodiment, at least 50 percent of the cylinder circumference of the adsorber unit is provided for the simultaneous loading with gas containing burdening substances, with annular channels comprising the required number of cells conveniently being provided for the simultaneous loading of several adsorber cells.

The hot gas used for the desorption of the load, e.g. consisting of liquid solvents, is mainly a gas inert to the load at desorption temperature, thus not reactive with it, for instance flue gas, but may also comprise other gases which are preferably circulated.

The process according to the invention is explained in detail in the following on the basis of an exemplary embodiment of an apparatus for carrying out the process with reference to the accompanying drawings wherein.

Figure 1:
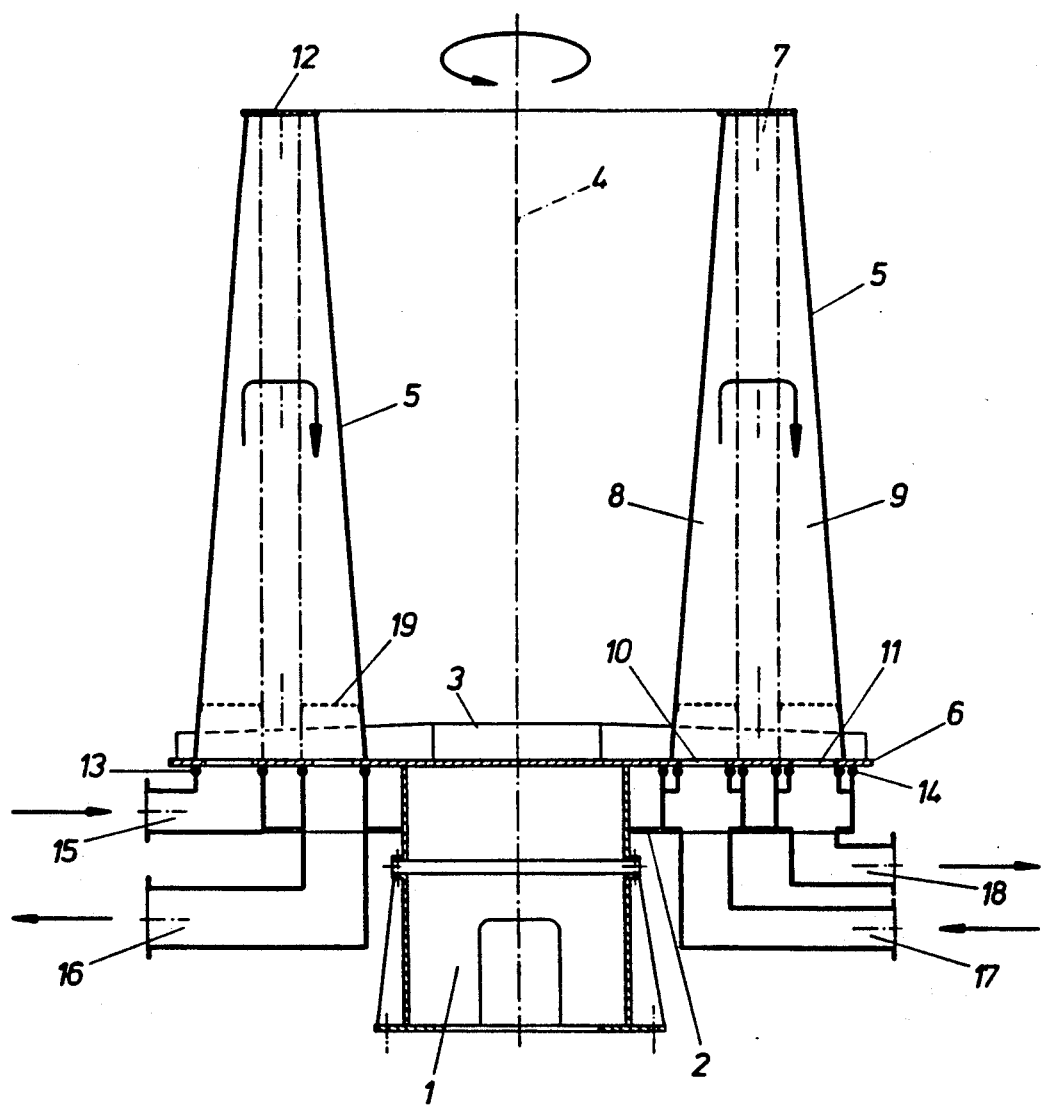
FIG. 1 shows a diagrammatic elevational view of the apparatus of this invention.

On a machine foundation 1, a supporting plate 2 is provided for the various gas conduits and above this there is provided an adsorber wheel 3 which is rotated in operation by a drive—preferably intermittently, but possibly also continuously—about the vertical axis 4 and equipped with adsorber boxes 5 resting on a sealing and supporting plate 6. The sealing and supporting plate 6 is also referred to as a sealing plate or sealing disk herein. The adsorber wheel 3 may be hydraulically lifted and lowered.

The adsorber boxes 5 disposed on the periphery of the adsorber wheel 3 extend away from the sealing disk 6, parallel to the axis of rotation 4 and have a central adsorber bed 7 as well as a radially inner inlet or outlet flow space 8 and a radially outer inlet or outlet flow space 9 tapering from the sealing disk 6 towards the free end of the adsorber boxes 5. The sealing disk 6 is provided with orifices 10, 11 corresponding with the inlet and outlet flow spaces 8, 9 so that the adsorber bed 7 is passed through the sealing disk 6. The end of each adsorber box 5 is provided with a cover 12, and the sealing disk 6 is provided with a corresponding cover (not represented), for exchanging the adsorber material.

In the operation of the rotary adsorber, the gas conduits leading from underneath to the sealing disk 6 seal against its underside. FIG. 1 shows the required seals 13 and 14 schematically as circles on the upper end of the gas conduits. So-called docking seals, i.e. seals which do not abut during the rotation of the adsorber wheel 3 and are not placed against the wheel until after it has stopped, are suitable for continuous operation if e.g. two adsorber units arranged for staggered operation are used. It is further possible to use seals whose contact pressure during rotation of the wheel is reduced, e.g. lip seals applied by means of an inflatable tube (not shown). Seals with constant sealing action are also used in practice, e.g. elastically applied sealing material strips, ribs, webs of suitable profiles, and hydraulic seals with heavy liquid and the like, none of which are specifically shown herein.

FIG. 1 shows in the left-hand part the loading of the adsorber bed 7 and in the right-hand part the desorption of the load, the desorption being effected in counterflow to the loading direction.

The conduit 15 is used for introducing crude gas which passes the orifice 11 in the sealing plate 6, the radially outer space 9 (which in this case is the inlet flow space) and the adsorber bed 7, where it discharges its load onto the adsorber material, and is discharged as purified gas via the radially inner space 8 (which in this case is the outlet flow space) the orifice 10 in the sealing plate 6 and the conduit 16.

For desorption, hot regeneration gas (the double seals 14 show that tighter sealing is required is regeneration) is introduced via conduit 17 and orifice 10 in the sealing plate 6 into the radially inner space 8 (which in this Case is the inlet flow space), passes the absorber bed 7 from which it desorbs the load and is then discharged via the radially outer space 9 (which in this case is the outlet flow space), the orifice 11 in the sealing plate 6 and the conduit 18 for further processing, e.g. condensation of its load.

Figure 2:
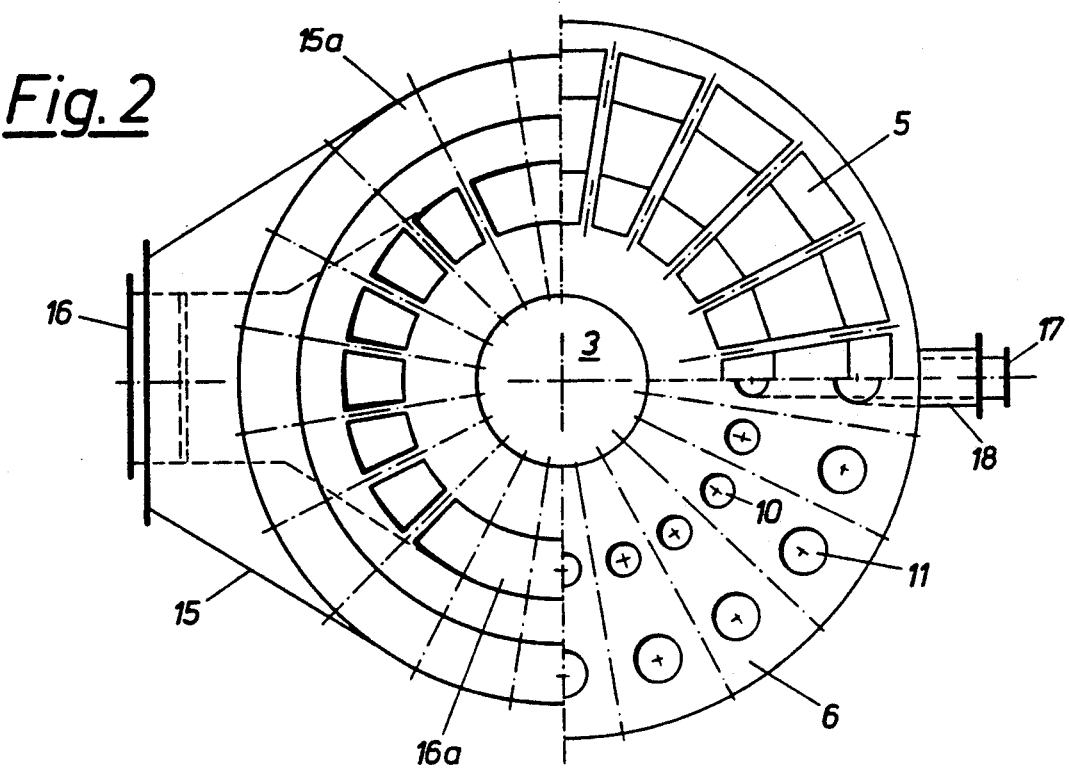
FIG. 2 shows a diagrammatic, partially sectional plan view of the apparatus of FIG. 1, with a rotary adsorber, with only the gas conduits for loading and desorbing being represented for the sake of simplicity; additional gas conduits for inertization, cooling and/or drying of the adsorber material normally being provided.

FIG. 2 shows that in loading the adsorber material, several adsorber boxes 5 are loaded simultaneously, while only one each adsorber box is regenerated by desorption. The gas line is formed as a flow box, with one each annular channel 15a, 16a comprising the required number of adsorber boxes 5 being associated with the inlet conduit 15 for the crude gas and the outlet conduit 16 for the purified gas.

It is evident from FIG. 2 that the inlet and outlet conduit and the associated annular channels are symmetrically arranged; however, asymmetric feeding may be convenient, in particular on the inlet flow side, in order to achieve a required pressure gradient distribution over the adsorber boxes involved.

In order to achieve a uniform utilization of the adsorber bed over its entire length in the adsorber box, the inlet flow spaces and outlet flow spaces 8 and 9 taper from the sealing plate 6 away in the direction of their free ends, although other configurations are also possible. Distributing means are conveniently provided in these spaces in order to obtain the required distribution of pressure and local flow. The distributing means can have the form of baffle plates, deflection blades, damming and distributing screens, perforated plates and the like and are known to the knowledgeable worker in the field of fluidic mechanics. FIG. 1 shows damming and distributing screens 19 close to the sealing plate 6 which among others permit a better flow permeation of the lower bed region where compensate formation frequently occurs.

Figure 3:
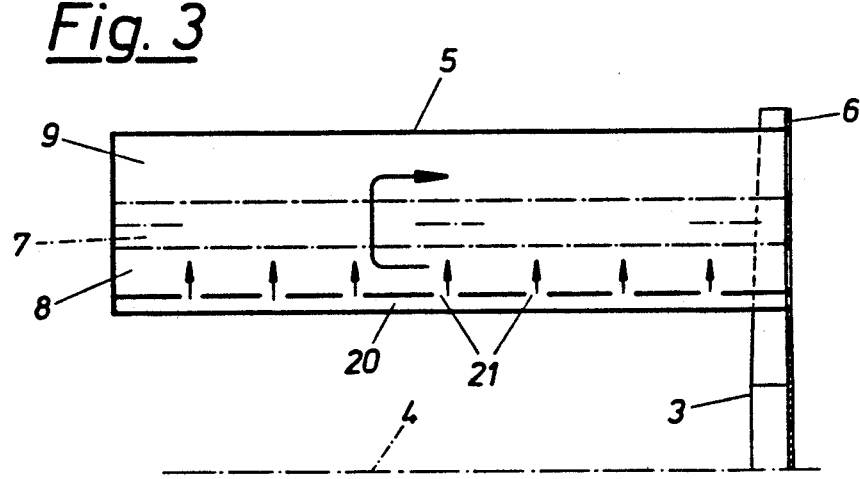
FIG. 3 shows a partial view of an alternative embodiment of the apparatus of this invention to that of FIG. 1, but shown rotated in the plane of the water 90 degrees from that shown in FIG. 1, with steam lances for desorption.

FIG. 3 partially represents an adsorber box 5 in which the cross section of inlet flow space 8 and outlet flow space 9 remains unchanged over its entire length. A steam lance 20 fed from the side of the sealing disk 6 or from the opposite end and from which steam is directly passed onto the adsorber bed via nozzles 21 is provided in the radially inner space 8. The nozzles have outlet openings of preferably rectangular cross section.

The invention is not limited to the embodiments represented and described. So, for instance, loading and desorbing may be carried out in parallel flow, as known, without difficulty. Furthermore, the adsorber boxes need not have symmetrical cross sections and their shape need not be essentially trapezoidal such as shown in FIG. 2.

A vertical arrangement of the axis of rotation, i.e. upright or depending adsorber boxes, (FIG. 1 and FIG. 2 turned upside down) is preferred for various reasons, but not compulsory in the known manner. Upright or depending adsorber boxes permit improved discharge of condensate, better charging and discharging of the beds and improved access to the seals.

It is understood that the passages 10, 11 through the sealing plate 6 can be of other than circular cross section.

We claim:

1. Apparatus for the continuous purification of gases containing burdening substances by the treatment thereof with adsorbing material and concomitant regeneration thereof with desorption fluid, which comprises in combination,
   (a) a foundation;
   (b) supporting plate means mounted on said foundation so as to provide an upper face and a lower face;
   (c) a plurality of annularly spaced radially outer orifices formed in said plate means;
   (d) a plurality of annularly spaced radially inner orifices formed in said plate means concentric with said radially outer orifices;
   (e) adsorber wheel means supported by and mounted for rotation above said upper face of the supporting plate means about an axis normal to said supporting plate means;
   (f) adsorber box means carried by said adsorber wheel means, said box means comprising a frustoconical shape parallel to said axis provided with a central cylindrical bed of adsorbing material, radially outer flow space contiguous with said bed of adsorbing material, radially inner flow space contiguous with said bed of adsorbing material, said radially outer and radially inner flow spaces adapted to provide a reversal of flow of gases directed through said flow spaces and bed of adsorbing material;

(g) conduit means for introducing crude gas mounted in sealing relationship to the lower face of said supporting plate means in communication with a plurality of said radially outer or radially inner orifices;

(h) conduit means for recovering purified gas mounted in sealing relationship to the lower face of said supporting plate means in communication with a plurality of said radially outer or radially inner orifices and adapted to receive the flow through said orifices from said conduit means for introducing crude gas;

(i) conduit means for introducing desorption fluid mounted in sealing relationship to the lower face of said supporting plate means in flow communication with a radially outer or radially inner orifice other than an orifice communicating with conduit means for introducing crude gas or conduit means for recovering purified gas;

(j) conduit means for recovering desorption fluid mounted in sealing relationship to the lower face of said supporting plate means in communication with a radially outer or radially inner orifice other than an orifice communicating with conduit means for introducing crude gas or conduit means for recovering purified gas and adapted to receive the flow through said orifices from said conduit means for introducing desorption fluid; whereby said radially outer and radially inner flow spaces of said adsorber box means are juxtaposed with respect to said radially outer and radially inner orifices in said supporting plate means so as to, upon rotation of said wheel means, alternatingly transmit flow of either (1) crude gas and purified gas or (2) desorption fluid and desorption fluid containing burdening substances, and wherein said adsorber wheel means is adapted to be lifted from said supporting plate means.

* * * * *